United States Defensive Publication [19] (H) [11] T978,001

Yoneyama et al. [43] Jan. 2, 1979

[54] SILVER HALIDE PHOTOGRAPHIC PHOTOSENSITIVE MATERIAL

[76] Inventors: Masakazu Yoneyama; Yasuo Mukunoki; June Yamaguchi; Kimitaka Kameoka; Yutaka Oka, all of No. 210, Nakanuma, Minami-ashigara-shi, Kanagawa, Japan

[21] Appl. No.: 823,790

[22] Filed: Aug. 11, 1977

[30] Foreign Application Priority Data

Aug. 11, 1976 [JP] Japan ..... 51-96343

[51] Int. Cl.[2] ..... G03C 1/38

[52] U.S. Cl. ..... 96/114.5

[57] ABSTRACT

A silver halide photographic photosensitive material in which at least one of the hydrophilic colloid layers thereof contains an organic sulfonic acid composition comprising at least one of the compounds represented by the general formula (I)

$$A - SO_3M \qquad (I)$$

wherein A represents a monovalent residue of an unsaturated hydrocarbon having one double bond and containing 8 to 18 carbon atoms, and M represents a hydrogen atom, an alkali metal atom, an alkaline earth metal atom, an ammonium group or an alkylammonium group; and at least one of compounds represented by the general formula (II)

$$B-\underset{\underset{OH}{|}}{CH}-(CH_2)_n-SO_3M \qquad (II)$$

wherein B represents a monovalent residue of a saturated hydrocarbon containing 6 to 16 carbon atoms, n is 1, 2 or 3, and M has the same meanings as M in the above general formula (I).

5 Claims, No Sheets Drawing,

27 Pages Specification

The file of this unexamined application may be inspected and copies thereof may be purchased (849 O.G. 1221, Apr. 9, 1968).